(12) United States Patent
Frank et al.

(10) Patent No.: US 11,358,457 B2
(45) Date of Patent: Jun. 14, 2022

(54) ROOF ARRANGEMENT FOR A VEHICLE ROOF AND VEHICLE ROOF WITH A ROOF OPENING

(71) Applicant: Webasto SE, Stockdorf (DE)

(72) Inventors: Matthias Frank, Stockdorf (DE);
Stefan Schäufler, Stockdorf (DE);
Andreas Josef Zunzer, Stockdorf (DE); Reinhard Wenzel, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 236 days.

(21) Appl. No.: 16/634,292

(22) PCT Filed: Jul. 31, 2018

(86) PCT No.: PCT/EP2018/070731
§ 371 (c)(1),
(2) Date: Jan. 27, 2020

(87) PCT Pub. No.: WO2019/030053
PCT Pub. Date: Feb. 14, 2019

(65) Prior Publication Data
US 2020/0156452 A1    May 21, 2020

(30) Foreign Application Priority Data
Aug. 11, 2017 (DE) .................... 10 2017 118 397.3

(51) Int. Cl.
*B60J 10/80* (2016.01)
*B60J 10/86* (2016.01)
(Continued)

(52) U.S. Cl.
CPC .............. *B60J 10/82* (2016.02); *B60J 7/043* (2013.01); *B60J 10/248* (2016.02); *B60J 10/80* (2016.02); *B60J 10/86* (2016.02); *B60J 10/87* (2016.02)

(58) Field of Classification Search
CPC ... B60J 10/80; B60J 10/82; B60J 10/86; B60J 10/87; B60J 10/248; B60J 7/00; B60J 7/043
(Continued)

(56) References Cited

U.S. PATENT DOCUMENTS 4,541,665 A * 9/1985 Draper ................... B60J 7/1642
296/218
5,100,197 A    3/1992 Ichinose et al.
(Continued)

FOREIGN PATENT DOCUMENTS

CN    104553698 A    4/2015
DE    4005789 A1    6/1990
(Continued)

OTHER PUBLICATIONS

Schull et al., "Vehicle roof with an adjustable cover", Mar. 16, 2017, German Patent Office, Edition: DE102015011640A1 (Year: 2017).*
(Continued)

*Primary Examiner* — Dennis H Pedder
*Assistant Examiner* — Joyce Eileen Hill
(74) *Attorney, Agent, or Firm* — Fitch, Even, Tabin & Flannery, LLP

(57) ABSTRACT

A roof arrangement for a vehicle roof with a roof opening may have a movable roof element for optionally closing or at least partially opening the roof opening, wherein the roof element is held by a frame; a first strand-like sealing profile; a second strand-like sealing profile which is formed separately from the first sealing profile, wherein the first sealing
(Continued)

Figure 1:
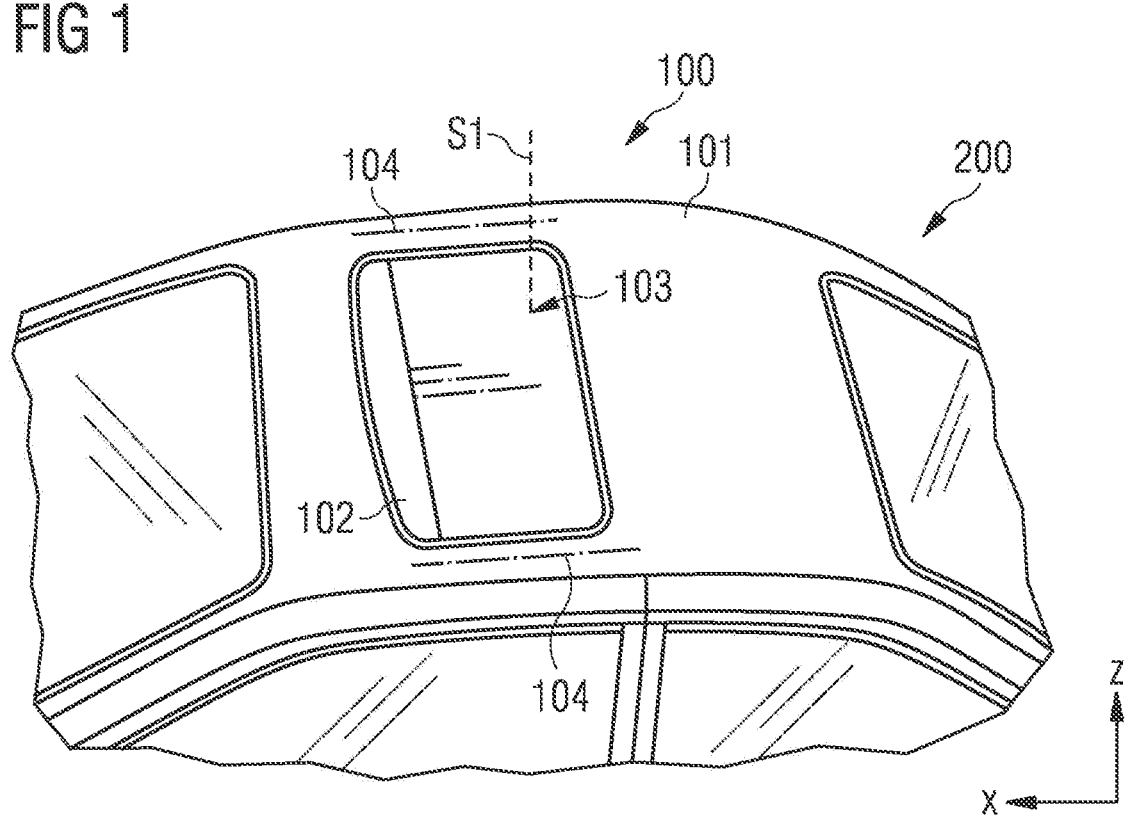

profile is configured for sealing in relation to the movable roof element and is fastenable to the vehicle roof; and the second sealing profile is fastened to the frame and is configured for sealing in relation to the frame, wherein the second sealing profile has a drip lip which lies against the frame.

10 Claims, 3 Drawing Sheets

(51) Int. Cl.
  *B60J 10/248* (2016.01)
  *B60J 7/043* (2006.01)
  *B60J 10/82* (2016.01)
(58) Field of Classification Search
  USPC .......................................... 296/216.01–0.09
  See application file for complete search history.

(56) References Cited

U.S. PATENT DOCUMENTS

| | | | |
|---|---|---|---|
| 6,685,263 B2* | 2/2004 | Sawada | B60J 10/82 |
| | | | 296/216.06 |
| 2004/0232733 A1* | 11/2004 | Ota | B60J 10/21 |
| | | | 296/216.06 |
| 2015/0151617 A1 | 6/2015 | Um et al. | |
| 2017/0240035 A1 | 8/2017 | Allali | |

FOREIGN PATENT DOCUMENTS

| | | | | |
|---|---|---|---|---|
| DE | 102015011640 A1 * | 3/2017 | ............. | B60J 7/024 |
| DE | 102016112579 B3 | 8/2017 | | |
| JP | H08-40076 A | 2/1996 | | |

OTHER PUBLICATIONS

International Search Report for PCT/EP2018/070731 dated Oct. 12, 2018 enclosed herewith (6 pages).

* cited by examiner

ROOF ARRANGEMENT FOR A VEHICLE ROOF AND VEHICLE ROOF WITH A ROOF OPENING

CROSS-REFERENCE TO RELATED APPLICATIONS

This application is a U.S. national phase application filed under 35 U.S.C. § 371 of International Application No. PCT/EP2018/070731, filed Jul. 31, 2018, designating the United States, which claims priority from German Patent Application No. 10 2017 118 397.3, filed on Aug. 11, 2017, which is hereby incorporated herein by reference in their entirety for all purposes.

FIELD

The application relates to a roof arrangement for a vehicle roof, in particular for a vehicle roof having a movable roof element. The invention further relates to a vehicle roof having such a roof opening.

BACKGROUND

A vehicle roof of a motor vehicle may have a roof opening which is closed and optionally at least partially opened by a movable roof element. For example, a seal is provided for sealing the vehicle roof to the movable roof element. This seal is intended to prevent penetrating water from passing into a dry region of the vehicle roof and/or of the motor vehicle.

It is desirable to provide a roof arrangement which permits a reliable seal. It is additionally desirable to provide a vehicle roof with such a roof arrangement which is sealable in a reliable manner.

SUMMARY

According to one aspect, a roof arrangement for a vehicle roof has a movable roof element. The vehicle roof has a roof opening. The movable roof element is designed optionally to close or at least partially to open the roof opening. The roof element is held by a frame of the roof arrangement. The roof arrangement has a first strand-like sealing profile and a second strand-like sealing profile. The second strand-like sealing profile is formed separately from the first sealing profile.

In particular, before they are mounted, the first sealing profile and the second sealing profile are movable in relation to one another and, in particular, produced separately from one another. For example, the first sealing profile and the second sealing profile comprise different materials. In particular, in each case the first sealing profile and the second sealing profile are separate components which are mountable independently of one another.

The first sealing profile is configured for sealing in relation to the movable roof element and is fastenable to the vehicle roof. The second sealing profile is fastened to the frame and is configured for sealing in relation to the frame. The second sealing profile has a drip lip which lies against the frame.

The roof opening with the two separate sealing profiles makes it possible for different sealing functions to be able to be implemented by the separate sealing profiles. In particular, the first sealing profile is provided for sealing in relation to the vehicle roof and is also fastened to the vehicle roof. The second sealing profile is provided for sealing in relation to the frame and is also fixed to the frame. As a result, in each case the two sealing profiles are fixed or fixable to the component relative to which they are also intended to seal.

In the ready-to-operate state the first sealing profile is fastened to the vehicle roof and, when the roof element is closed, seals the transition between the roof element and the vehicle roof. Water which still passes into the interior between the first sealing profile and the roof element is conducted into a water guiding channel of the frame. So that penetrating water is conducted as fully as possible in this water guiding channel and may be discharged in a controlled manner and does not pass into a dry region, the second sealing profile is provided. The second sealing profile is sealed to the frame such that water is not able to pass along the frame into the interior of the motor vehicle into a dry region. In particular, penetrating water is prevented from passing into the dry region via the second sealing profile.

By means of the embodiment as two separate sealing profiles, it is possible for the sealing to be carried out in a reliable manner in relation to the frame, irrespective of a curvature of the frame and a curvature of the vehicle roof. In particular, the frame and the vehicle roof may be curved differently so that a spacing between the frame and the vehicle roof at least partially changes. The drip lip of the second sealing profile is always in the same relative position to the frame irrespective of the curvature of the vehicle roof and thus has a reliable overpressure in relation to the frame. As a result, a significant increase in the robustness of the entire water management system is achieved, in particular in comparison with conventional sealing concepts using a single seal which is sealed both in relation to the movable roof element and also in relation to the frame.

According to at least one embodiment, the drip lip is configured to project longitudinally in order to form a common contact surface with the frame, the drip lip lying on said contact surface against the frame. The contact surface is configured, in particular, along the entire length of the drip lip so that a gap, which is as small as possible and through which water could penetrate into the dry region, is produced between the drip lip and the frame.

According to at least one embodiment, the second sealing profile and the frame have a common adhesively bonded connection. The second sealing profile is adhesively bonded to the frame by means of the adhesively bonded connection. Thus a physical separation is possible between the dry region and the wet region. The adhesively bonded connection forms the fastening of the sealing profile on the frame. Alternatively or additionally, the second sealing profile is fastened to the frame by means of a plug connection. The second sealing profile is connected to the frame by means of the plug connection. Thus a physical separation is possible between the dry region and the wet region. The plug connection forms the fastening of the sealing profile to the frame.

According to at least one embodiment, the drip lip extends from the adhesively bonded connection to the frame. In particular, the contact surface of the drip lip relative to the frame is configured on a side of the drip lip remote from the adhesively bonded connection.

According to at least one further embodiment, the first sealing profile has a mounting surface, the first sealing profile being fastenable thereby to the vehicle roof. The first sealing profile is not connected to the frame but in the ready-to-operate state is connected to the vehicle roof, in particular to the part of the vehicle roof which defines the roof opening.

According to at least one embodiment, the second sealing profile has a sealing lip for sealing in relation to the vehicle roof. In the ready-to-operate state the sealing lip lies against the vehicle roof so that a reliable seal is produced between the frame and the vehicle roof by means of the second sealing profile. The sealing lip serves, for example, for sealing relative to dust and sound. Moreover, the contribution of the sealing lip is such that, as far as possible, no water passes into the dry region.

According to at least one embodiment, the first sealing profile has a further drip lip. The drip lip is used such that penetrating water directly drips off at the location of the penetration via the further drip lip into the wet region. The water droplets dripping from the further drip lip are guided, for example, into the water guiding channel and safely discharged. The further drip lip is, for example, a projecting or protruding element which is designed such that a droplet adhering thereto, in particular a water droplet, may drip and drain away from the sealing profile in a defined manner.

According to at least one embodiment, the first sealing profile has a first sealing tube. According to at least one further embodiment, the second sealing profile has a second sealing tube. In particular, in each case the individual elements of the sealing profile are configured on the sealing tube. For example, the adhesively bonded connection is configured on the sealing tube.

In particular, the drip lip protrudes from the sealing tube of the second sealing profile. For example, the sealing lip of the second sealing profile also protrudes from the sealing tube of the second sealing profile. For example, the further drip lip is configured as a projecting element of the sealing tube of the first sealing profile.

According to at least one embodiment a vehicle roof has a roof opening. According to at least one embodiment according to the application the vehicle roof has a roof arrangement. The vehicle roof has the movable roof element for optionally closing or at least partially opening the roof opening. The frame which holds the movable roof element is coupled to the vehicle roof, for example screwed thereto. The first strand-like sealing profile is fastened, for example adhesively bonded and/or mechanically fixed, to the vehicle roof. The second strand-like sealing profile is configured separately from the first sealing profile. The vehicle roof thus has two separate sealing profiles, one thereof being fixed to the vehicle roof itself and the other thereof being fixed to the frame.

According to at least one embodiment, in a main direction of extent the first sealing profile and the second sealing profile at least partially have a varying spacing from one another along the length of the two sealing profiles. In particular, when the frame and the vehicle roof have a varying spacing from one another, the two sealing profiles also have a varying spacing from one another. Due to the separation into the two separate sealing profiles a reliable seal is possible in spite of the varying spacing. In particular, the contact of the drip lip of the second sealing profile with the frame is always provided even if the spacing of the frame varies in relation to the vehicle roof. The drip lip of the second sealing profile is prevented from lifting away from the frame, for example when the spacing increases between the frame and the vehicle roof.

Further advantages, features and developments are disclosed from the following examples described in connection with the figures.

Elements which are the same, similar and functionally the same may be provided in the figures with the same reference numerals.

BRIEF DESCRIPTIONS OF THE DRAWINGS

Figure 2:
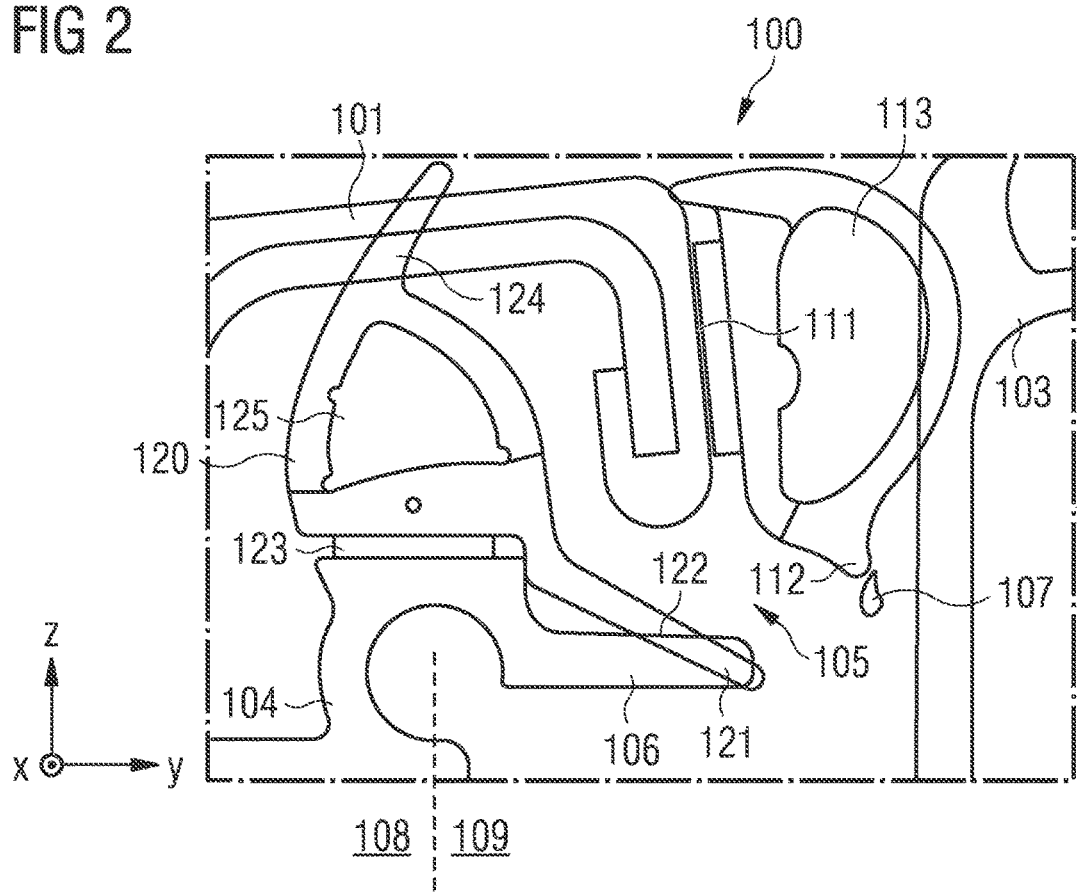
Figure 3:
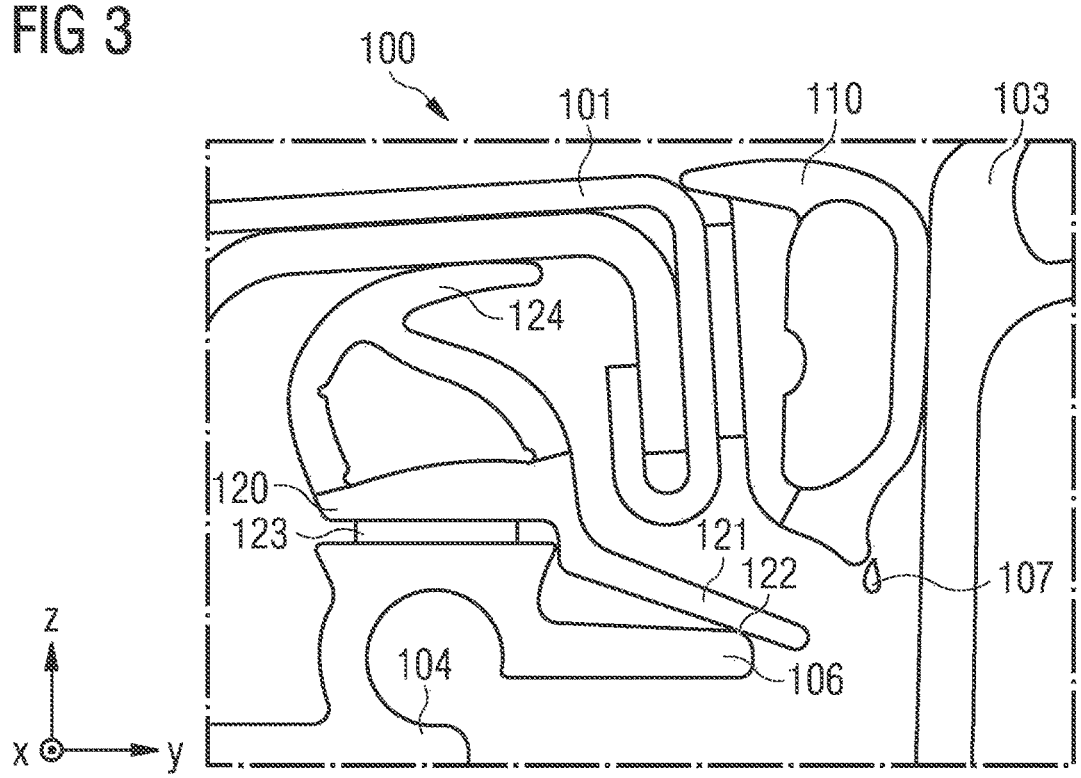
Figure 4:
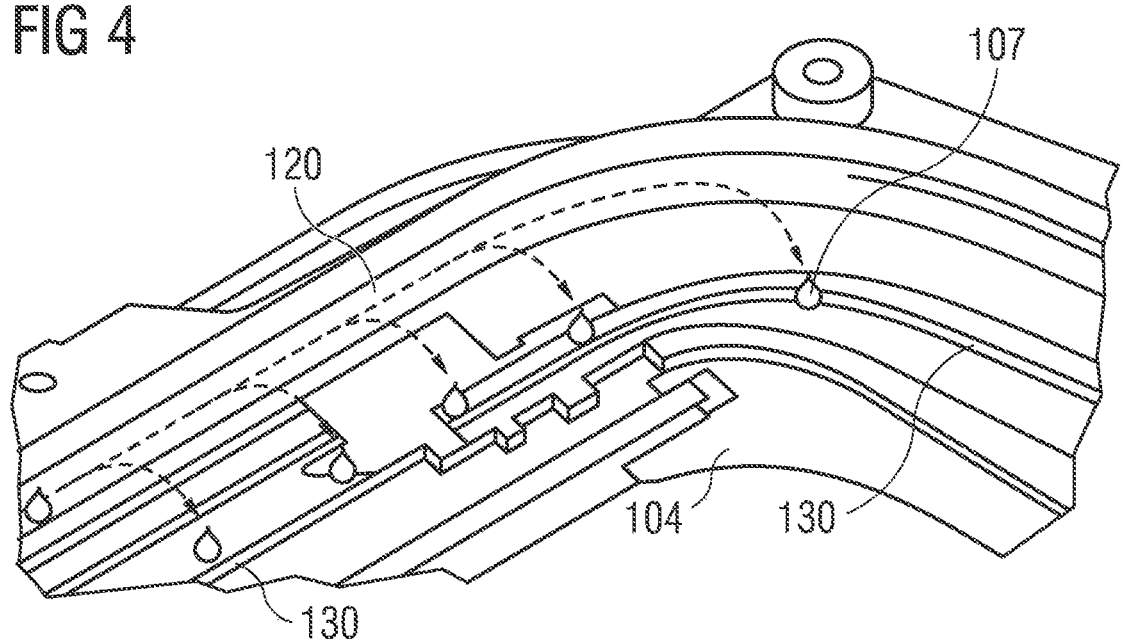

In the drawings:

FIG. 1 shows a schematic view of a vehicle roof according to an exemplary embodiment, FIG. 2 shows a schematic cross-sectional view of a roof arrangement according to an exemplary embodiment, FIG. 3 shows a schematic cross-sectional view of the roof arrangement according to an exemplary embodiment, and FIG. 4 shows a schematic perspective view of the roof arrangement according to an exemplary embodiment.

DETAILED DESCRIPTION

FIG. 1 shows a vehicle roof 101 of a motor vehicle 200. The vehicle roof 101, in particular, is the roof which is fixed to the vehicle and which is also called the roof skin. The vehicle roof 101 surrounds a roof opening 102. The roof opening 102 is optionally closed or at least partially openable by means of a movable roof element 103 which is displaceable in a direction X.

The movable roof element 103, also called the cover, is held by a frame 104. The frame 104 has, for example, guide rails which are fastened on either side of the roof opening 102 to the vehicle roof 101. The frame has, in particular, further elements which, for example, are arranged transversely to the X-direction on a front face of the roof opening 102. The frame 104 serves, in particular, for guiding the movement of the roof element 103 and for holding further elements such as drive motors and/or cables. The roof element 103 and the frame 104 are, in particular, parts of a roof arrangement 100 which is able to be used as a separate subassembly with the vehicle roof 101.

FIG. 2 shows a schematic sectional view along an exemplary cutting plane S1 (FIG. 1). The roof arrangement 100 additionally has a first strand-like sealing profile 110 and a second strand-like sealing profile 120 in addition to the roof element 103 and the frame 104. The first sealing profile 110 may be denoted as a roof cutout seal and the second sealing profile 120 may be denoted as a secondary seal. The two sealing profiles 110, 120 are resilient in an elastically flexible manner. For example, in each case at least the sealing portions of the sealing profiles 110 and 120 are produced from foamed and/or flexible rubber material, rubber-type material or rubber-like material, whilst other portions of the sealing profile are produced from harder material, in particular rubber-like material or rubber material. Exemplary materials are EPDM, microcellular rubber, NBR or silicone rubber.

The two sealing profiles 110, 120 each have a main direction of extent which corresponds to the X-direction in FIGS. 2 and 3. Along the main direction of extent the sealing profiles 110, 120 are configured in each case to be longer than in the two other directions transversely to the main direction of extent. In FIGS. 2 and 3 the sealing profiles 110, 120 in each case are expanded to a greater extent in the X-direction than in the Y-direction and the Z-direction.

The first sealing profile 110 serves for sealing the movable roof element 113. The second sealing profile 120 serves for sealing the frame 104 and is arranged between the frame 104 and the vehicle roof 101 in a Z-direction. The first sealing profile is arranged in a Y-direction between the vehicle roof 101 and the roof element 103. The directions X, Y, Z are, in particular, in each case perpendicular to one another.

FIG. 2 shows the two sealing profiles 110 and 120 in terms of their expansion before they are actually in the ready-to-operate state. FIG. 3 shows the two sealing profiles 110 and 120 in the manner in which they are compressed by the adjacent components, in particular by the roof element 103, the frame 104 and the vehicle roof 101, in order to ensure a seal relative to water 107 and dust and sound.

When the vehicle roof 101 is closed, i.e. when the roof element 103 is fully arranged in the roof opening 102, the first sealing profile 110 substantially seals the transition between the vehicle roof 101 and the roof element 103. However, water 107 may pass between the roof element 103 and the sealing profile 110 counter to the Z-direction in the direction of the vehicle interior. This water is discharged in a wet region 109 into a water guiding channel 130 (FIG. 4) and drained therefrom in a controlled manner. Thus water may be prevented or at least substantially prevented from passing into a dry region 108 of the vehicle 200.

The first sealing profile 110 has a first sealing tube 113. The first sealing profile 110 is, for example, produced from rubber or a rubber-like material. The first sealing tube 113 is sealed in relation to the movable roof element 103. For example, a mounting surface 111 is provided on the first sealing tube 113. In the mounting surface 111 the first sealing profile 110 is connected to the vehicle roof 101, for example adhesively bonded thereto. The first sealing profile 110 is, for example, sealed by means of the adhesive bond in relation to the vehicle roof 101.

A drip lip 112 is provided on the first sealing tube 113. The drip lip 112 faces downwardly, approximately in the negative Z-direction. The drip lip 112 is, for example, formed from solid material, microcellular rubber or a combination of both. Water which passes between the first sealing profile 110 and the roof element 103 in the direction of the vehicle interior drips off the drip lip 112. For example, when the motor vehicle 200 is inclined it is possible for water to drip in the direction of the frame 104, as shown in FIGS. 2 and 3. In order to prevent this water from passing into the dry region 108, the second sealing profile 120 is provided, said second sealing profile being separate and separately configured from the first sealing profile 110.

The second sealing profile 120 is formed from a rubber or a rubber-like material and, in particular, is at least partially flexible and/or resilient. The second sealing profile 120 has a second sealing tube 125. A drip lip 121 is configured on the second sealing tube 125. The drip lip 121 extends from the second sealing tube 125 in the direction of the frame 104 and in the direction of the roof element 103. The drip lip 121 may be configured in different shapes, for example linear, curved and have projecting or set-back regions, for example an additional projection.

The drip lip 121 has a common contact surface 122 with the frame 104. The drip lip 121 is pressed against the frame 104 so that on the common contact surface 122 no water may pass between the second sealing profile 120 and the frame 104. The drip lip 121 is connected to the second sealing tube 125 at an end remote from the roof element 103 counter to the Y-direction. The opposing end, which is remote from the second sealing tube 125 and which faces the roof element 103, is a free end of the drip lip 121. The contact surface 122 is configured at this free end.

The second sealing profile 120 is connected by means of an adhesively bonded connection 123 to the frame 104. For example, the second sealing profile 120 is adhesively bonded on a guide rail of the frame 104 by means of the adhesively bonded connection 123. The adhesively bonded connection, in particular, is configured in a plane which has its main direction of extent in the XY-plane. The frame 104 has a rib 106 which also has its main extent in the XY-plane.

Starting from the region of the second sealing profile, the adhesively bonded connection 123 being configured thereon, the drip lip 121 initially extends slightly in the negative Z-direction and then mainly in the Y-direction so that the drip lip 121 in the Y-direction is pressed between the adhesively bonded connection 123 and the roof element 103 against the rib 106 and the contact surface 122 is formed.

The second sealing profile 120 has a sealing lip 124 on an upper side in the Z-direction. The sealing lip 124 in the ready-to-operate state is compressed with the vehicle roof 101 and primarily seals relative to dust and sound which thus does not pass into the vehicle interior or only passes to a reduced extent into the vehicle interior.

The first and the second sealing profile 110 and 120 have a spacing 105 from one another and, in particular, are not in contact with one another. The spacing 105 is, for example, configured along the entire length of the two sealing profiles 110 and 120.

FIG. 4 shows a perspective view of the frame 104. The second sealing profile 120 is attached to the periphery of the frame 104. According to further exemplary embodiments, the second sealing profile 120 only extends along partial regions. The second sealing profile 120, in particular, may be already connected to the frame 104 before the frame 104 is coupled to the vehicle roof 101. The water 107, which during operation may pass into the interior, is reliably guided by the second sealing profile 120, and in particular the drip lip 121, into the water guiding channel 130. Water from the wet region 109 is prevented from being able to pass into the dry region 108 since the second sealing profile 120 is fixedly connected to the frame 104 and thus a physical separation is formed between the dry region 108 and the wet region 109. By the fastening of the second sealing profile 120 to the frame 104, relative to which the second sealing profile 120 is also designed to be sealed, the second sealing profile 120 is prevented from being lifted away from the frame 104. Such a lifting-away would constitute a weak point in the vehicle roof 101 and permit water to be able to pass from the wet region 109 into the dry region 108.

The first sealing profile 110 and the second sealing profile 120 are thus fastened both to the vehicle roof 101 and to the frame 104. The first sealing profile fastened to the vehicle roof 101 undertakes the following functions: sealing the roof element 103 relative to the vehicle roof 101 by means of the sealing tube 113; defined discharge of water 107 penetrating the wet region 109 of the roof arrangement 100 by means of the further drip lip 112. The second sealing profile 120 which is fastened to the frame 104 undertakes the following functions: sealing the roof element 103 relative to dust and noise by means of the second sealing tube 125 and the sealing lip 124; sealing relative to the upper rib 106 of the frame 104 for increasing the robustness of the water management system by means of the drip lip 121.

The sealing concept according to the application with the two sealing profiles 110, 120 which are separate from one another makes it possible to ensure, in the given constructional space conditions, that in all possible inclinations of the roof the water penetrating at the first sealing tube 113 drips as fully as possible into the water guiding wet region 109 provided therefor. It is possible to prevent water from reaching the upper rib 106. The second sealing tube 125 does not have to serve alone as a seal of the dry region 108 in relation to the wet region 109. The drip lip 121 primarily seals the wet region 109 in relation to the dry region 108. Thus the risk of leakage is reduced. In its position, the second sealing profile 120 follows the frame 104 and not the roof element 103. Thus, as a result, the penetrating water 107 may be conducted away from the frame 104 by the drip lip 121. A different curvature of the frame 104 from the curvature of the vehicle roof 101, which for example differ from one another in the Z-direction by several millimeters, does not lead to the drip lip 121 lifting away from the rib 106. The spacing of the frame 104 from the second sealing profile 120 does not vary along the frame 104. Thus the sealing function on the drip lip 121 is reliably ensured, even in the case of tolerances.

The first sealing profile 110 manages without a secondary balloon which is required in conventional roof cutout seals. The decoupling of the individual sealing functionalities into the two separate sealing profiles 110, 120 makes it possible for the drip lip 121 always to have the same relative position and thus overpressure in relation to the frame 104, irrespective of the ratios of curvature of the frame 104 relative to the vehicle roof 101. Penetrating water 107 is held back by the upper rib 106, whereby an increase in the reliability of the entire water management system is achieved. In particular, an improvement in the reliability of the water management system in the transition region between the guide rail of the frame 104 to the front frame part of the frame 104 is possible. The position and thus the overpressure of the drip lip 121 in relation to the frame 104 is reproducible. The sealing concept according to the application is usable both for steel and aluminum roof skins of the vehicle roof 101. Due to the elimination of the secondary balloon on the first sealing profile 110 the sealing concept is simplified in comparison with conventional roof cutout seals. Overall, therefore, a reliable water management system is possible by means of the two separate sealing profiles 110, 120.

The invention claimed is:

1. A roof arrangement for a vehicle roof with a roof opening, having a movable roof element for optionally closing or at least partially opening the roof opening,
   - wherein the roof element is held by a frame, a first strand-like sealing profile a second strand-like sealing profile which is formed separately from the first sealing profile,
   - wherein the first sealing profile is configured for sealing in relation to the movable roof element and is fastenable to a portion of the vehicle roof that defines the roof opening,
   - the second sealing profile being fastened to the frame and configured for sealing in relation to the vehicle roof,
   - wherein the second sealing profile has a second sealing profile drip lip which lies against the frame, and
   - wherein the frame is adapted to be rigidly fixed to the vehicle roof.

2. The roof arrangement according to claim 1, wherein the second sealing profile drip lip is configured to protrude longitudinally to form a common contact surface with the frame, the drip lip lying on said contact surface against the frame.

3. The roof arrangement according to claim 1, wherein the second sealing profile and the frame have a common adhesively bonded connection.

4. The roof arrangement according to claim 3, wherein the second sealing profile drip lip extends from the adhesively bonded connection to the frame.

5. The roof arrangement according to claim 1, wherein the first sealing profile has a mounting surface, the first sealing profile being fastenable thereby to the vehicle roof.

6. The roof arrangement according to claim 1, wherein the second sealing profile has a sealing lip for sealing in relation to the vehicle roof.

7. The roof arrangement according to claim 1, wherein the first sealing profile has a first sealing profile drip lip.

8. The roof arrangement according to claim 1, wherein the first sealing profile has a first sealing tube and the second sealing profile has a second sealing tube.

9. A vehicle roof with a roof opening, having: a roof arrangement according to claim 1, wherein the frame which holds the movable roof element is coupled to the vehicle roof, and the first strand-like sealing profile is fastened to the vehicle roof.

10. The vehicle roof according to claim 9, wherein in a main direction of extent (X) the first sealing profile and the second sealing profile at least partially have varying spacing from one another along a length of the first and second sealing profiles.

* * * * *